United States Patent
Li

(10) Patent No.: US 11,467,956 B2
(45) Date of Patent: Oct. 11, 2022

(54) METHOD AND SYSTEM OF RESOURCE-SAVING METADATA UPDATE AND VERIFICATION IN GARBAGE COLLECTION

(71) Applicant: ALIBABA GROUP HOLDING LIMITED, Grand Cayman (KY)

(72) Inventor: Shu Li, Sunnyvale, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/951,448

(22) Filed: Nov. 18, 2020

(65) Prior Publication Data

US 2022/0156183 A1 May 19, 2022

(51) Int. Cl.
*G06F 12/02* (2006.01)
*G06F 12/1009* (2016.01)
*G06F 9/50* (2006.01)

(52) U.S. Cl.
CPC ........ *G06F 12/0253* (2013.01); *G06F 9/5022* (2013.01); *G06F 12/0246* (2013.01); *G06F 12/1009* (2013.01); *G06F 2209/5011* (2013.01); *G06F 2212/2022* (2013.01); *G06F 2212/7201* (2013.01); *G06F 2212/7205* (2013.01)

(58) Field of Classification Search
CPC ............. G06F 12/0253; G06F 12/1009; G06F 9/5022; G06F 12/0246; G06F 2212/7205; G06F 2212/7201; G06F 2212/2022; G06F 2209/5011
See application file for complete search history.

(56) References Cited

U.S. PATENT DOCUMENTS

| | | | |
|---|---|---|---|
| 2017/0068621 A1* | 3/2017 | Watanabe | G06F 12/0871 |
| 2018/0081799 A1* | 3/2018 | Kanno | G06F 12/0246 |
| 2020/0042439 A1* | 2/2020 | Oh | G06F 3/064 |
| 2020/0394136 A1* | 12/2020 | Byun | G06F 12/0804 |

* cited by examiner

*Primary Examiner* — Tasnima Matin
(74) *Attorney, Agent, or Firm* — Finnegan, Henderson, Farabow, Garrett & Dunner, LLP

(57) ABSTRACT

The present disclosure provides methods, systems, and non-transitory computer readable media for optimizing data storing. An exemplary method comprises: determining, by a host, a source physical storage to be released as a part of the garbage collection process and a destination physical storage to store data transferred from the source physical storage as a part of the garbage collection process; reading a logic address log corresponding to the data from the source physical storage to a controller, wherein the logic address log comprises logic addresses corresponding to the data; determining, by the controller, whether the logic addresses are valid; transferring the valid logic addresses to the host; and updating a mapping table with destination physical addresses according to the valid logic addresses, wherein: the mapping table is stored in the host, and the destination physical addresses correspond to the destination physical storage.

17 Claims, 9 Drawing Sheets

METHOD AND SYSTEM OF RESOURCE-SAVING METADATA UPDATE AND VERIFICATION IN GARBAGE COLLECTION

TECHNICAL FIELD

The present disclosure generally relates to data storage, and more particularly, to methods, systems, and non-transitory computer readable media for optimizing performance of a host-based data storage system.

BACKGROUND

All modern-day computers have some form of secondary storage for long-term storage of data. Traditionally, hard disk drives ("HDDs") were used for this purpose, but computer systems are increasingly turning to flash drives, such as solid-state drives ("SSDs"), as their secondary storage units. SSDs implement management firmware that is operated by microprocessors inside the SSDs for functions, performance, and reliability. While offering significant advantages over HDDs, the firmware mechanism of SSDs experience difficulties in meeting more demanding requirements on drive performance. Moreover, garbage collection processes for open-channel SSDs can cause significant bandwidth usage between a host and the flash drives.

SUMMARY OF THE DISCLOSURE

Embodiments of the present disclosure provide a method for performing a garbage collection process. The method comprises: determining, by a host, a source physical storage to be released as a part of the garbage collection process and a destination physical storage to store data transferred from the source physical storage as a part of the garbage collection process; reading a logic address log corresponding to the data from the source physical storage to a controller, wherein the logic address log comprises logic addresses corresponding to the data; determining, by the controller, whether the logic addresses are valid; transferring the valid logic addresses to the host; and updating a mapping table with destination physical addresses according to the valid logic addresses, wherein: the mapping table is stored in the host, and the destination physical addresses correspond to the destination physical storage.

Embodiments of the present disclosure further provide a non-transitory computer readable medium that stores a set of instructions that is executable by at least one processor of a system to cause the system to perform a method of a garbage collection process. The method comprises: determining, by a host, a source physical storage to be released as a part of the garbage collection process and a destination physical storage to store data transferred from the source physical storage as a part of the garbage collection process; reading a logic address log corresponding to the data from the source physical storage to a controller, wherein the logic address log comprises logic addresses corresponding to the data; determining, by the controller, whether the logic addresses are valid; transferring the valid logic addresses to the host; and updating a mapping table with destination physical addresses according to the valid logic addresses, wherein: the mapping table is stored in the host, and the destination physical addresses correspond to the destination physical storage.

Embodiments of the present disclosure provide a system for perform a garbage collection process. The system comprises: a host; a source physical storage configured to be released as a part of the garbage collection process; a destination physical storage configured to store data transferred from the source physical storage as a part of the garbage collection process; a controller communicatively coupled to the host, the source physical storage, and the destination physical storage, the controller is configured to: read a logic address log corresponding to the data from the source physical storage, wherein the logic address log comprises logic addresses corresponding to the data; determine whether the logic addresses are valid; and transfer the valid logic addresses to the host, wherein: the host is configured to update a mapping table with destination physical addresses according to the valid logic addresses, the mapping table is stored in the host, and the destination physical addresses correspond to the destination physical storage.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
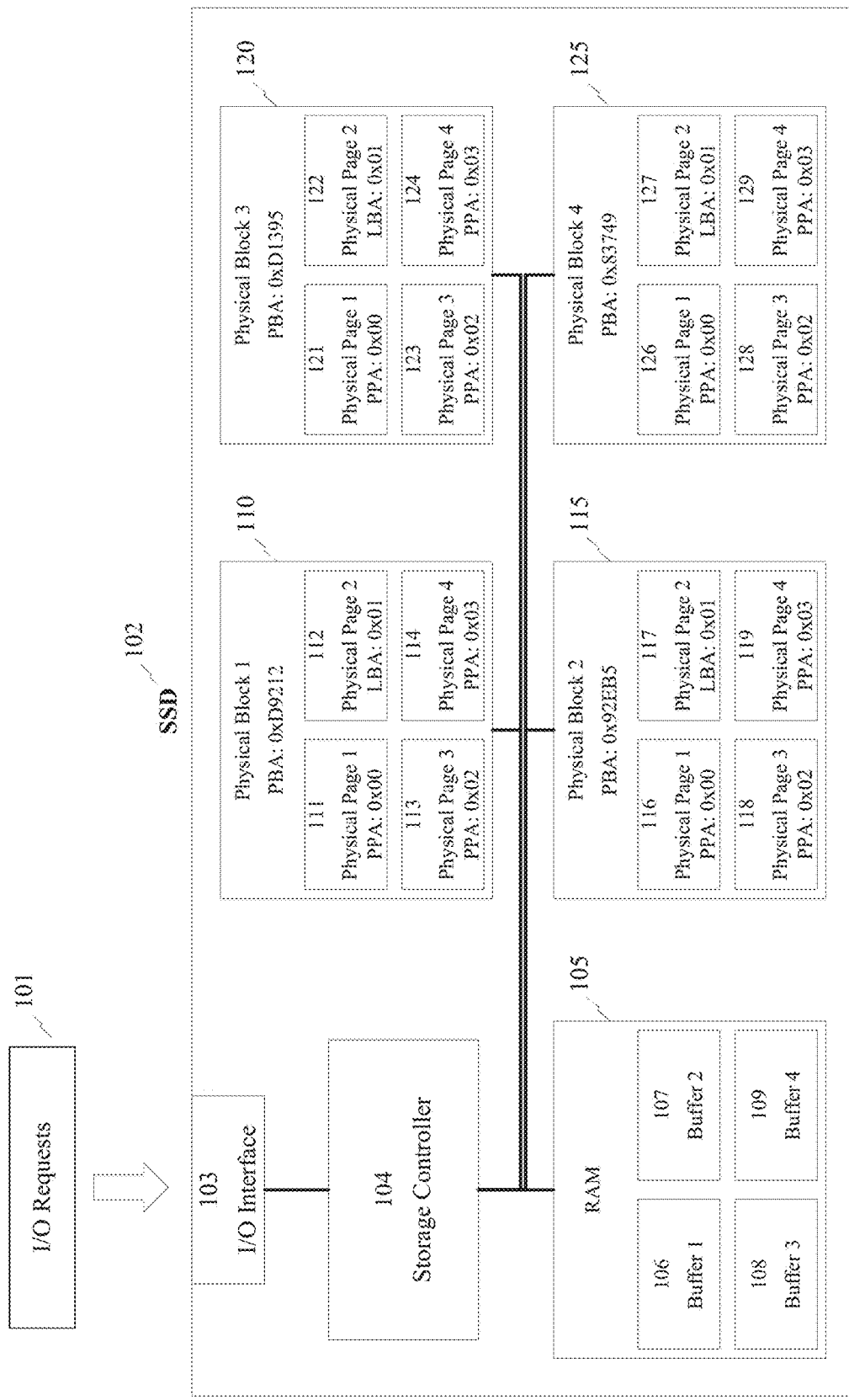
FIG. 1 is an example schematic illustrating a basic layout of an SSD, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Modern day computers are based on the Von Neuman architecture. As such, broadly speaking, the main components of a modern-day computer can be conceptualized as two components: something to process data, called a processing unit, and something to store data, called a primary storage unit. The processing unit (e.g., CPU) fetches instructions to be executed and data to be used from the primary storage unit (e.g., RAM), performs the requested calculations, and writes the data back to the primary storage unit. Thus, data is both fetched from and written to the primary storage unit, in some cases after every instruction cycle. This means that the speed at which the processing unit can read from and write to the primary storage unit can be important to system performance. Should the speed be insufficient, moving data back and form becomes a bottleneck on system performance. This bottleneck is called the Von Neumann bottleneck.

High speed and low latency are factors in choosing an appropriate technology to use in the primary storage unit. Modern day systems typically use DRAM. DRAM can transfer data at dozens of GB/s with latency of only a few nanoseconds. However, in maximizing speed and response time, there can be a tradeoff. DRAM has three drawbacks. DRAM has relatively low density in terms of amount of data stored, in both absolute and relative measures. DRAM has a much lower ratio of data per unit size than other storage technologies and would take up an unwieldy amount of space to meet current data storage needs. DRAM is also significantly more expensive than other storage media on a price per gigabyte basis. Finally, and most importantly, DRAM is volatile, which means it does not retain data if power is lost. Together, these three factors make DRAM not as suitable for long-term storage of data. These same limitations are shared by most other technologies that possess the speeds and latency needed for a primary storage device.

In addition to having a processing unit and a primary storage unit, modern-day computers also have a secondary storage unit. What differentiates primary and secondary storage is that the processing unit has direct access to data in the primary storage unit, but not necessarily the secondary storage unit. Rather, to access data in the secondary storage unit, the data from the second storage unit is first transferred to the primary storage unit. This forms a hierarchy of storage, where data is moved from the secondary storage unit (non-volatile, large capacity, high latency, low bandwidth) to the primary storage unit (volatile, small capacity, low latency, high bandwidth) to make the data available to process. The data is then transferred from the primary storage unit to the processor, perhaps several times, before the data is finally transferred back to the secondary storage unit. Thus, like the link between the processing unit and the primary storage unit, the speed and response time of the link between the primary storage unit and the secondary storage unit are also important factors to the overall system performance. Should its speed and responsiveness prove insufficient, moving data back and forth between the memory unit and secondary storage unit can also become a bottleneck on system performance.

Traditionally, the secondary storage unit in a computer system was HDD. HDDs are electromechanical devices, which store data by manipulating the magnetic field of small portions of a rapidly rotating disk composed of ferromagnetic material. But HDDs have several limitations that make them less favored in modern day systems. In particular, the transfer speeds of HDDs are largely stagnated. The transfer speed of an HDD is largely determined by the speed of the rotating disk, which begins to face physical limitations above a certain number of rotations per second (e.g., the rotating disk experiences mechanical failure and fragments). Having largely reached the current limits of angular velocity sustainable by the rotating disk, HDD speeds have mostly plateaued. However, CPU's processing speed did not face a similar limitation. As the amount of data accessed continued to increase, HDD speeds increasingly became a bottleneck on system performance. This led to the search for and eventually introduction of a new memory storage technology.

The storage technology ultimate chosen was flash memory. Flash storage is composed of circuitry, principally logic gates composed of transistors. Since flash storage stores data via circuitry, flash storage is a solid-state storage technology, a category for storage technology that doesn't have (mechanically) moving components. A solid-state based device has advantages over electromechanical devices such as HDDs, because solid-state devices does not face the physical limitations or increased chances of failure typically imposed by using mechanical movements. Flash storage is faster, more reliable, and more resistant to physical shock. As its cost-per-gigabyte has fallen, flash storage has become increasingly prevalent, being the underlying technology of flash drives, SD cards, the non-volatile storage unit of smartphones and tablets, among others. And in the last decade, flash storage has become increasingly prominent in PCs and servers in the form of SSDs.

SSDs are, in common usage, secondary storage units based on flash technology. Technically referring to any secondary storage unit that does not involve mechanically moving components like HDDs, SSDs are made using flash technology. As such, SSDs do not face the mechanical limitations encountered by HDDs. SSDs have many of the same advantages over HDDs as flash storage such as having significantly higher speeds and much lower latencies. However, SSDs have several special characteristics that can lead to a degradation in system performance if not properly managed. In particular, SSDs must perform a process known as garbage collection before the SSD can overwrite any previously written data. The process of garbage collection can be resource intensive, degrading an SSD's performance.

The need to perform garbage collection is a limitation of the architecture of SSDs. As a basic overview, SSDs are made using floating gate transistors, strung together in strings. Strings are then laid next to each other to form two dimensional matrices of floating gate transistors, referred to as blocks. Running transverse across the strings of a block (so including a part of every string), is a page. Multiple blocks are then joined together to form a plane, and multiple planes are formed together to form a NAND die of the SSD, which is the part of the SSD that permanently stores data. Blocks and pages are typically conceptualized as the building blocks of an SSD, because pages are the smallest unit of data which can be written to and read from, while blocks are the smallest unit of data that can be erased.

FIG. 1 is an example schematic illustrating a basic layout of an SSD, according to some embodiments of the present disclosure. As shown in FIG. 1, an SSD 102 comprises an I/O interface 103 through which the SSD communicates to a host system via input-output ("I/O") requests 101. Connected to the I/O interface 103 is a storage controller 104, which includes processors that control the functionality of the SSD. Storage controller 104 is connected to RAM 105, which includes multiple buffers, shown in FIG. 1 as buffers 106, 107, 108, and 109. Storage controller 104 and RAM 105 are connected to physical blocks 110, 115, 120, and 125. Each of the physical blocks has a physical block address ("PBA"), which uniquely identifies the physical block. Each of the physical blocks includes physical pages. For example, physical block 110 includes physical pages 111, 112, 113, and 114. Each page also has its own physical page address ("PPA"), which is unique within its block. Together, the physical block address along with the physical page address uniquely identifies a page—analogous to combining a 7-digit phone number with its area code. Omitted from FIG. 1 are planes of blocks. In an actual SSD, a storage controller is connected not to physical blocks, but to planes, each of which is composed of physical blocks. For example, physical blocks 110, 120, 115, and 125 can be on a sample plane, which is connected to storage controller 104.

Figure 2:
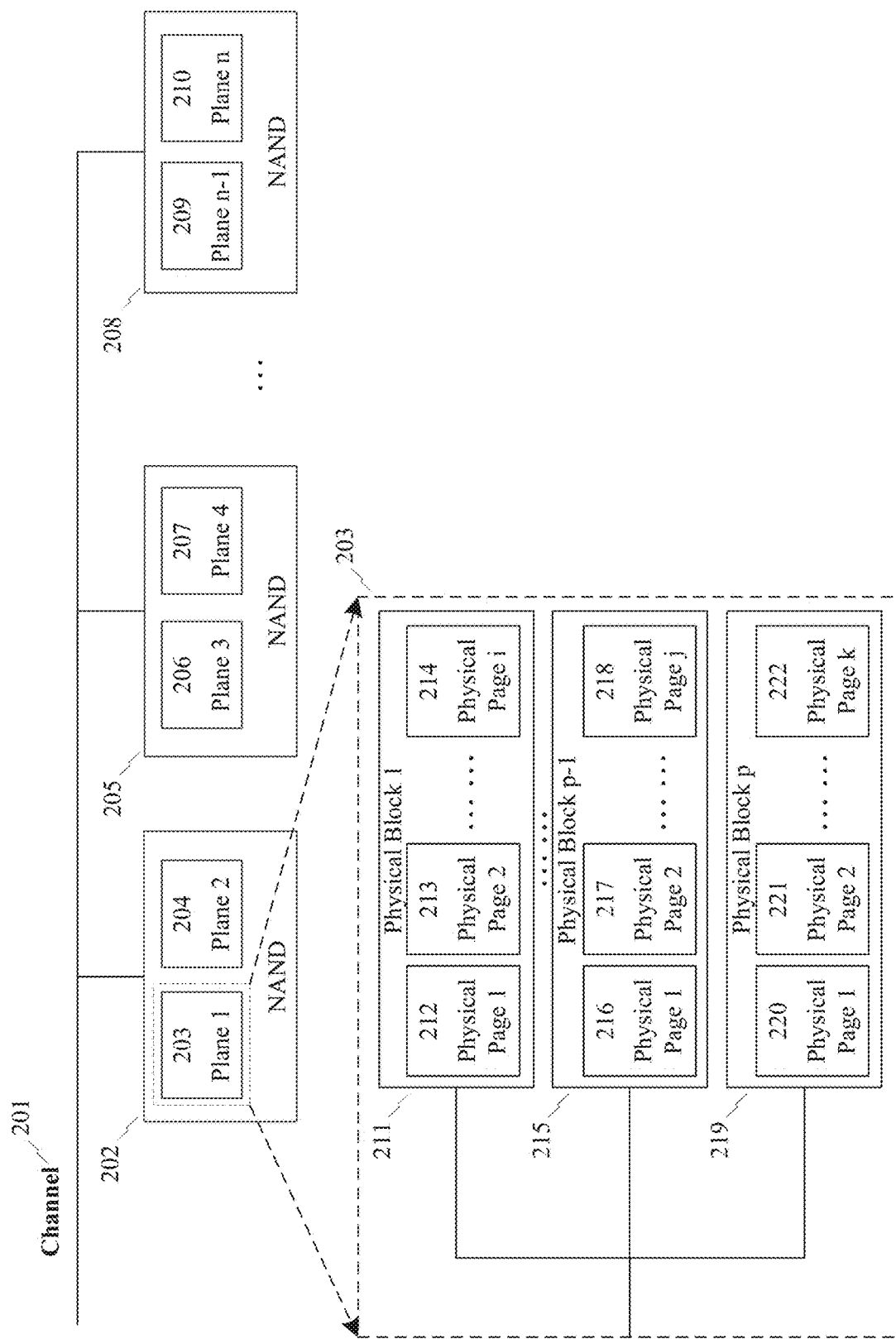
FIG. 2 is an illustration of an exemplary internal NAND flash structure of an SSD, according to some embodiments of the present disclosure.

FIG. 2 is an illustration of an exemplary internal NAND flash structure of an SSD, according to some embodiments of the present disclosure. As stated above, a storage controller (e.g., storage controller 104 of FIG. 1) of an SSD is connected with one or more NAND flash integrated circuits ("ICs"), which is where data received by the SSD is ultimately stored. Each NAND IC 202, 205, and 208 typically comprises one or more planes. Using NAND IC 202 as an example, NAND IC 202 comprises planes 203 and 204. As stated above, each plane comprises one or more physical blocks. For example, plane 203 comprises physical blocks 211, 215, and 219. Each physical block comprises one or more physical pages, which, for physical block 211, are physical pages 212, 213, and 214.

An SSD typically stores a single bit in a transistor using the voltage level present (high or ground) to indicate a 0 or 1. Some SSDs also store more than one bit in a transistor using more voltage levels to indicate more values (e.g., 00, 01, 10, and 11 for two bits). Assuming an SSD stores only a single bit for simplicity, an SSD can write a 1 (e.g., can set the voltage of a transistor to high) to a single bit in a page. An SSD cannot write a zero (e.g., cannot set the voltage of a transistor to low) to a single bit in a page. Rather, an SSD can write a zero on a block-level. In other words, to set a bit of a page to zero, an SSD can set every bit of every page within a block to zero. By setting every bit to zero, an SSD can ensure that, to write data to a page, the SSD needs to only write a 1 to the bits as dictated by the data to be written, leaving untouched any bits that are set to zero (since they are zeroed out and thus already set to zero). This process of setting every bit of every page in a block to zero to accomplish the task of setting the bits of a single page to zero is known as garbage collection, since what typically causes a page to have non-zero entries is that the page is storing data that is no longer valid ("garbage data") and that is to be zeroed out (analogous to garbage being "collected") so that the page can be re-used.

Further complicating the process of garbage collection, however, is that some of the pages inside a block that are to be zeroed out may be storing valid data—in a worst case, all of the pages inside the block except the page needing to be garbage collected are storing valid data. Since the SSD needs to retain valid data, before any of the pages with valid data can be erased, the SSD (usually through its storage controller) needs to transfer each valid page's data to a new page in a different block. Transferring the data of each valid page in a block is a resource intensive process, as the SSD's storage controller transfers the content of each valid page to a buffer and then transfers content from the buffer into a new page. Only after the process of transferring the data of each valid page is finished may the SSD then zero out the original page (and every other page in the same block). As a result, in general the process of garbage collection involves reading the content of any valid pages in the same block to a buffer, writing the content in the buffer to a new page in a different block, and then zeroing-out every page in the present block.

Figure 3:
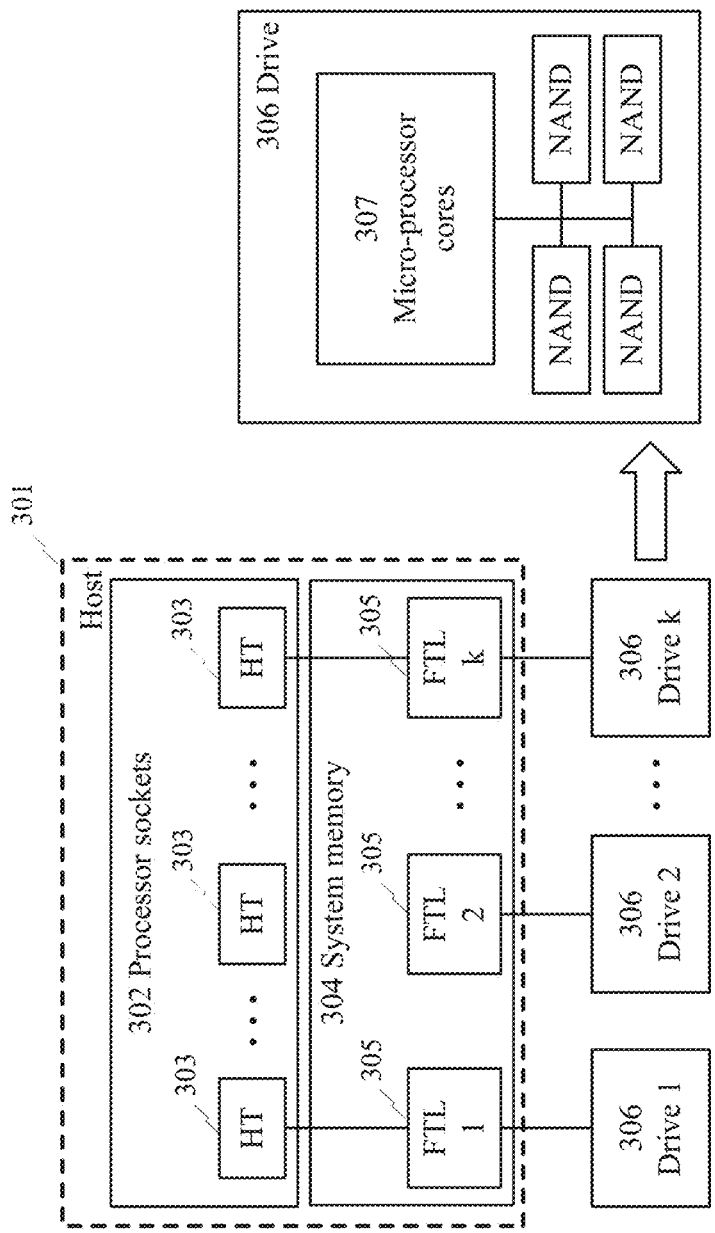
FIG. 3 is an illustration of an exemplary host-based flash translation layer SSD with host resource utilization, according to some embodiments of the present disclosure.

Referring back to FIG. 1, SSD 102 can be connected to a host system. For example, SSD 102 can be connected to a host system via I/O interface 103. Drives can be host managed drives, such as host-based flash translation layer ("FTL") SSD. Implementing FTLs in a host is a typical design choice for open-channel SSDs. FIG. 3 is an illustration of an exemplary host-based flash translation layer SSD with host resource utilization, according to some embodiments of the present disclosure. As shown in FIG. 3, host 301 can comprise processor sockets 302 and system memory 304. Processor sockets 302 can be configured as CPU sockets. Processor sockets 302 can comprise one or more HTs 303. System memory 304 can comprise one or more FTLs 305. In a server equipped with multiple drives (e.g., drives 306), each drive can launch its own FTL in the host (e.g., host 301). For example, Drive 1 shown in FIG. 3 can launch its own FTL 1 as a part of host 301 and claim a part of system memory 304. Meanwhile, the SSD shown in FIG. 3 (e.g., drive 306) still executes simplified firmware for tasks such as NAND media management and error handling. As a result, microprocessor cores in the SSD (e.g., micro-processor cores 307) are still needed.

In a host-based data storage, garbage collections are performed by recycling the occupied blocks in flash drives (e.g., drives 306). For example, the recycling can be performed by copying out the valid pages and erasing the blocks to free or release the physical space. The garbage collection copies out the valid pages from the source blocks (e.g., the blocks to be recycled) and store the data from the valid pages into a data buffer. The garbage collection also updates the mapping between logic addresses and physical address with new physical addresses in the destination location. For example, the logic addresses can be logic block addresses ("LBAs"), and the physical addresses can be physical block addresses ("PBAs"). The mapping can be stored in the host. Then the garbage collection can write the error-free pages to the new PBAs. When the data buffer is allocated from the system memory (e.g., system memory 304) at the host side (e.g., host 301), the garbage collection can consume significant memory bandwidth between the drives and the host.

Figure 4:
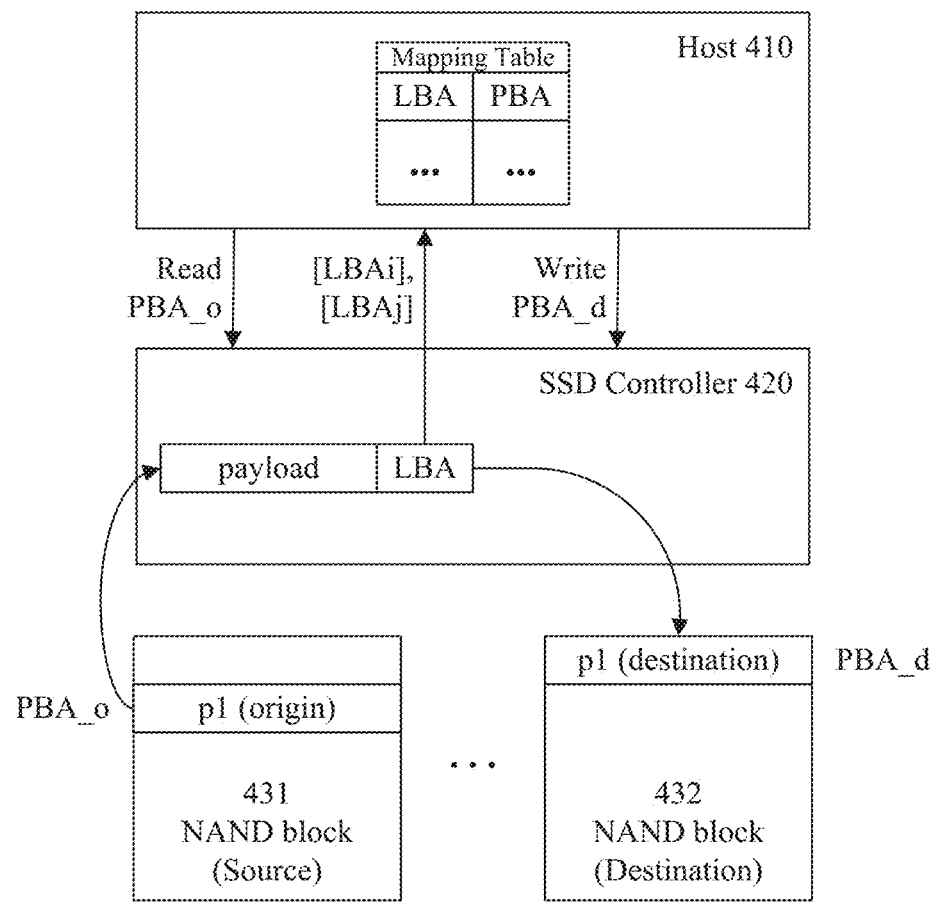
FIG. 4 is an illustration of an exemplary host-based flash translation layer SSD with host resource utilization for garbage collections, according to some embodiments of the present disclosure.

FIG. 4 is an illustration of an exemplary host-based flash translation layer SSD with host resource utilization for garbage collections, according to some embodiments of the present disclosure. As shown in FIG. 4, system 400 comprises a host 410, an SSD controller 420, and one or more NAND blocks, such as source NAND block 431 and destination NAND block 432. It is appreciated that host 410 can be similar to host 301 of FIG. 3, and the NAND blocks can be similar to drives 306 of FIG. 3. In some embodiments, the one or more NAND blocks are a part of the a flash drive. In some embodiments, SSD controller 420 is a part of the flash drive.

In some embodiments, as shown in FIG. 4, an LBA to PBA mapping table can be stored in host 410. When a garbage collection is performed in system 400, data from one NAND block is transferred to another NAND block. For example, as shown in FIG. 4, the PBA of the original data, namely PBA_o, can be determined according to the LBA to PBA mapping, and the PBA_o can be sent to SSD controller 420. Data p1 corresponding to PBA_o can be located in source NAND block 431 and can be transferred from source NAND block 431 to destination NAND block 432 as a part of the garbage collection. Valid pages in data p1 are read from source NAND block 431 into SSD controller 420. In some embodiments, data p1 is transferred into a data buffer in SSD controller 420, and data p1 can be stored as a payload in the data buffer. After data p1 is transferred into SSD controller 420, one or more LBAs corresponding to data p1 can be sent to host 410. For example, as shown in FIG. 4, a plurality of LBAs can be sent to host 410. The plurality of LBAs include LBAi and LBAj. In some embodiments, the data corresponding to LBAi and LBAj can be the same, but the addresses stored in LBAi and LBAj are not the same. Host 410 can then update the LBA to PBA mapping with a destination PBA, namely PBA_d. PBA_d can then be transferred from host 410 to SSD controller 420. In some embodiments, SSD controller 420 can perform data processing on data p1, such as noise removal. The processed data p1 can then be written into destination NAND block 432 according to PBA_d.

One advantage of system 400 is that data p1 no longer needs to be transferred into host memory. As a result, system 400 can free up more system memory capacity and reduce bandwidth usage between the host and the drives. This solution, however, may still have a limitation on the LBA to PBA mapping table. For example, as shown in FIG. 4, when a garbage collection is performed, host 410 may require the LBA information from SSD controller 420 to update the LBA to PBA mapping table stored in host 410. The LBA information can take up several bytes, which can add up. Moreover, the format of the LBA information is not friendly for the information exchange between host 410 and SSD controller 420. For example, the format can require additional padding, or extra packaging, which can directly extend the packet size of the LBA being transferred. Therefore, considerable bandwidth can be consumed on the unnecessary format, which impacts the efficiency of the garbage collection.

Embodiments of the present disclosure provide a novel design that improves garbage collection efficiency and reduces bandwidth consumption. Rather than extracting LBA information from SSD controllers and sending the LBA information one at a time to the host, the LBA information of the valid pages can be determined or calculated in a controller, and the group of LBAs for the valid pages can be sent to the host for updating the mapping table. In addition, when the valid pages are transferred as a part of the garbage collection process, the calculated LBAs can be compared with the actual LBA read from the NAND pages for further verification.

Figure 5:
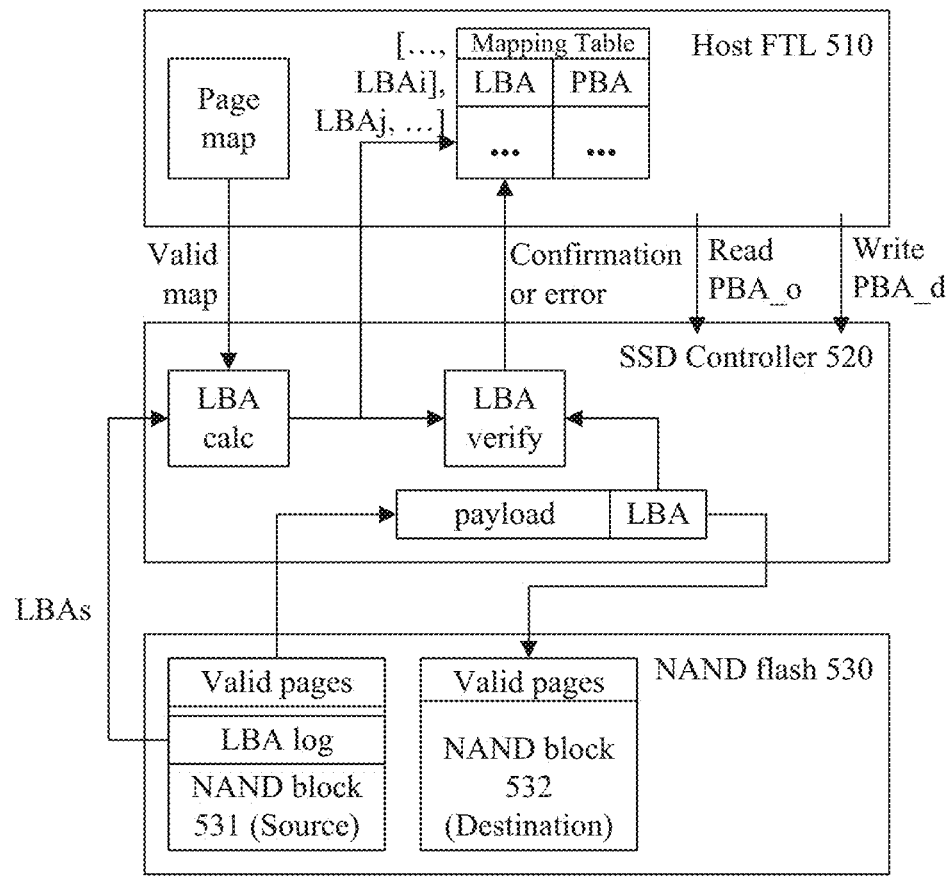
FIG. 5 is an illustration of an exemplary host-based flash translation layer SSD with host resource utilization for improved garbage collections, according to some embodiments of the present disclosure.

FIG. 5 is an illustration of an exemplary host-based flash translation layer SSD with host resource utilization for improved garbage collections, according to some embodiments of the present disclosure. As shown in FIG. 5, system 500 can comprise host FTL 510, SSD controller 520, and NAND flash 530. In some embodiments, NAND flash 530 comprises one or more NAND blocks. In some embodiments, the one or more NAND blocks 531 comprises a source NAND block 531 and a destination NAND block 532. It is appreciated that source NAND block 531 and destination NAND block 532 can be determined according to a garbage collection process. For example, as a part of the garbage collection process, data from source NAND block 531 can be transferred to destination NAND block 532. In some embodiments, after the data is transferred, source NAND block 531 can be erased or released as available storage for the flash drive.

In some embodiments, when system 500 performs garbage collections, host FTL 510 can determine which band of blocks is to be recycled as a part of the garbage collections. As a result, host FTL 510 can send a page map to SSD controller 520. The page map includes information on whether LBAs corresponding to the band of blocks is valid or invalid. For example, the page map can store flags corresponding to LBAs to denote whether an LBA from the LBAs is valid or invalid. In some embodiments, the page map can comprise information for page-level address translations. For example, the page-level address translation can include mapping between logic page numbers ("LPNs") and physical page numbers ("PPNs"). In some embodiments, only the valid data needs to be recycled during garbage collections. As a result, invalid LBAs, or LBAs corresponding to invalid data, can be ignored.

In some embodiments, source NAND block 531 includes an LBA log that stores some or all the LBAs in a specific block where the data is to be transferred as a part of the garbage collection. In some embodiments, the sequence of LBAs in the LBA log follows the NAND programming order. Since a NAND block's programming order is fixed, the LBA log can form a mapping between PBAs and LBAs in this block. A circuitry "LBA calc" shown in FIG. 5 can generate the valid LBAs for a series of NAND blocks to form a relatively larger data chunk that is suitable for transferring into host FTL together. Those valid LBAs are used to update the LBA to PBA mapping table in host FTL 510. As a result, the valid LBAs can be sent to host FTL 510 to update the LBA to PBA mapping table stored in host FTL 510. In some embodiments, one copy of the calculated LBAs can be stored in SSD controller 520.

Having received valid LBAs from SSD controller 520, host FTL 510 can use the valid LBAs to determine the PBAs of the original data, namely PBA_o, that corresponds to the valid LBAs. The PBA_o can be sent to SSD controller 520. As a part of the garbage collection process, SSD controller can use PBA_o to fetch valid data from source NAND block 531. In some embodiments, the fetched data can be noisy, and the noisy data can be corrected in SSD controller 520.

Having received valid LBAs from SSD controller 520, as a part of the garbage collection process, host FTL 510 uses the valid LBAs to update the mapping table with destination PBAs, namely PBA_d. The PBA_d can be sent to SSD controller 520. The corrected data stored in SSD controller 520 can then be written into the destination PBA in destination NAND block 531 according to PBA_d. In some embodiments, host FTL can re-order the valid LBAs to be recycled during the garbage collection process. For example, the garbage collection process can have a source block (e.g., source NAND block 531 of FIG. 5), and the original data layout in the source block may not be sequential. During the garbage collection process, host FTL 510 can re-order the sequence and placement of the valid LBAs so that the data layout is close to sequential access when the data is stored in the destination block (e.g., destination NAND block 531 of FIG. 5).

In some embodiments, when the payload and LBA have been fetched into SSD controller 520, the LBA read from the source NAND block can be compared with the calculated LBA. For example, as shown in FIG. 5, a circuitry "LBA verify" can compare the read LBA with the calculated LBA. If there is a mismatch, error information can be reported to the mapping table stored in host FTL 510. If there is no mismatch, the payload together with the LBA can written into the destination NAND block 531. In some embodiments, if there is no mismatch, a confirmation information can be reported to the mapping table stored in host FTL 510.

In some embodiments, when the error message is generated, source block 531 or the flash drive comprising source block 531 can be marked as read-only until the error is resolved, so that data reliability can be assured. In some embodiments, in response to receiving the error message, host FTL 510 can perform one or more error operations. For example, the error operations can include determining that the data that should not be erased may have been erased, marking the flash drive as a read-only flash drive, marking the flash drive as a corrupt flash drive, replacing the flash drive, and replicating data on the flash drive. In some embodiments, the circuitries shown in FIG. 5 can be implemented using software.

Figure 6:
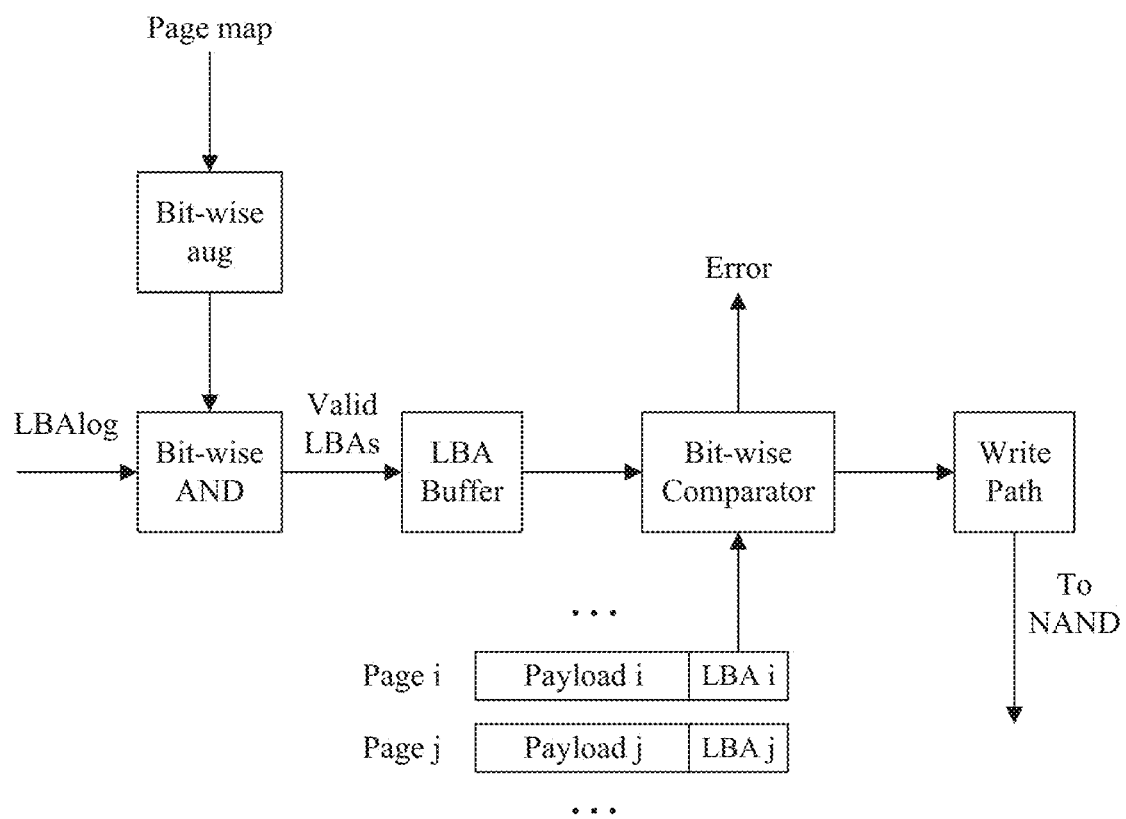
FIG. 6 is an illustration of an exemplary process for LBA calculation and verification, according to some embodiments of the present disclosure.

FIG. 6 is an illustration of an exemplary process for LBA calculation and verification, according to some embodiments of the present disclosure. It is appreciated that the process shown in FIG. 6 can be a part of a garbage collection process that is performed by system 500 shown in FIG. 5.

As shown in FIG. 6, a page map can use 1 bit (e.g., a valid bit) to denote whether an LBA is valid or not. A circuitry "bit-wise aug" can augment the 1 bit from the page map into a string that has an equal length as the LBA. For example, for LBAs having 4 bytes in length, if the 1 bit from the page map has a value of 1, the circuitry "bit-wise aug" can augment the value of 1 into 4 bytes, with each bit in the 4 bytes being equal to 1. If the 1 bit from the page map has a value of 0, the circuitry "bit-wise aug" can augment the value of 0 from the page map into 4 bytes, with each bit in the 4 bytes being equal to 0.

In some embodiments, after the "bit-wise aug," a circuitry "bit-wise AND" can perform a bit-wise AND operation on the augmented string with the incoming LBA. As a result, If the LBA is an invalid one, the invalid LBA becomes all zeros and can be dropped. If the LBA is valid, the valid LBA is not zeroed out. In some embodiments, the valid LBAs can be packed together and sent to a host (e.g., host FTL 510 of FIG. 5). In some embodiments, a copy of the valid LBAs can be stored in the LBA buffer inside a controller (e.g., SSD controller 520 of FIG. 5).

In some embodiments, a circuitry "bit-wise comparator" can take in the calculated LBAs and the read LBAs and compare the calculated LBAs with the read LBAs. If the calculated LBAs match the read LBAs, the calculated LBAs or the read LBAs can be used by the controller (e.g., SSD controller 520 of FIG. 5) to fetch the PBAs for the destination PBAs from the host (e.g., host FTL 510 of FIG. 5) and store the data according to the destination PBAs. In some embodiments, if the calculated LBAs do not match the read LBAs, an error message can be generated. In some embodiments, the error message can be forwarded to the host (e.g., host FTL 510 of FIG. 5) for further processing. In some embodiments, the circuitries shown in FIG. 6 can be implemented using software.

Figure 7:
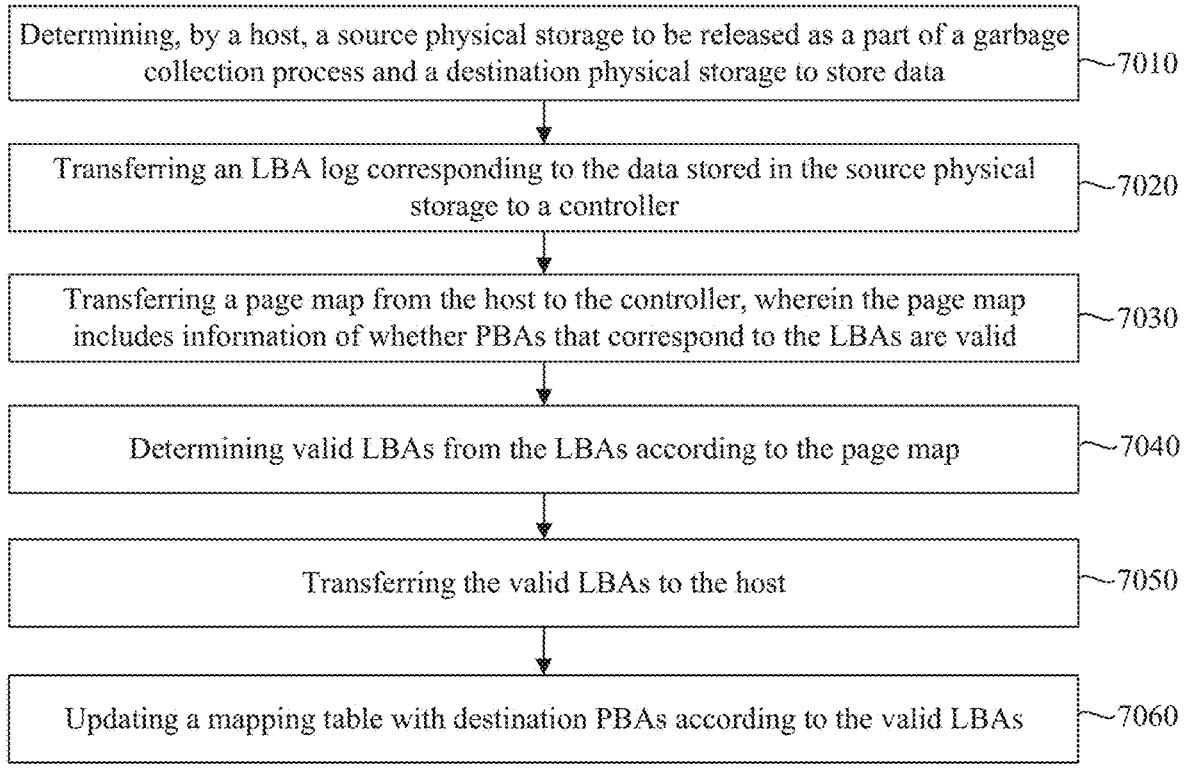
FIG. 7 is an illustration of an example method for utilizing host resources to improve garbage collections, according to some embodiments of the present disclosure.

Embodiments of the present disclosure further provide a method for host resource utilization of improved garbage collections. FIG. 7 is an illustration of an example method for utilizing host resources to improve garbage collections, according to some embodiments of the present disclosure. It is appreciated that method 7000 of FIG. 7 can be executed on system 500 shown in FIG. 5.

In step 7010, a host can determine a source physical storage to be released as a part of a garbage collection process and a destination physical storage to store data. In some embodiments, the host is an FTL on a host side (e.g., FTL 305 of FIG. 3 or host FTL 510 of FIG. 5). In some embodiments, the source physical storage and the destination physical storage are blocks in one or more flash drives. In some embodiments, the blocks are NAND blocks.

In step 7020, an LBA log corresponding to the data stored in the source physical storage is transferred from the source physical storage to a controller. The LBA log includes LBAs that correspond to the data. In some embodiments, the LBA log is read out from the source physical storage. In some embodiments, the LBA log comprises LBAs stored in an order that corresponds to a physical geometry of the source physical storage. For example, as shown in FIG. 5, the sequence of LBAs in the LBA log follows the NAND programming order for source NAND block 531. Since a NAND block's programming order is fixed, the LBA log is able to form a mapping between PBAs and LBAs in this block. In some embodiments, the controller is an SSD controller (e.g., SSD controller 520 of FIG. 5).

In step 7030, a page map is transferred from the host to the controller, wherein the page map includes information of whether LBAs that correspond to the data are valid. In some embodiments, the page map is similar to the page map shown in FIG. 5 or FIG. 6. In some embodiments, as shown in FIG. 5, the page map stores flags corresponding to LBAs to denote whether an LBA from the LBAs is valid or invalid. In some embodiments, only the valid data needs to be recycled during garbage collections, and the invalid data can be ignored in the recycling process. In some embodiments, as shown in FIG. 5, the page map can comprise information for page-level address translations. For example, the page-level address translation can include mapping between logical page numbers ("LPNs") and physical page numbers ("PPNs").

In step 7040, valid LBAs are determined from the LBAs according to the page map. In some embodiments, as shown in FIG. 5, the circuitry "bit-wise aug" can be applied to augment the value of the valid bit in the page map to the length of the LBAs. After the circuitry "bit-wise aug," the circuitry "bit-wise AND" can perform a bit-wise AND operation on the augmented string with the incoming LBAs. The invalid LBA can become all zeros and can be dropped or ignored. The valid LBAs can remain. In some embodiments, the valid LBAs can be packed together and sent to the host. In some embodiments, a copy of the valid LBAs can be stored in an LBA buffer inside the controller.

In step 7050, the valid LBAs are transferred to the host. For example, as shown in FIG. 5, valid LBAs can be determined by the circuitry "LBA calc," and the valid LBAs can be transferred to host FTL 510. In some embodiments, the valid LBAs are transferred to the mapping table stored in host FTL 510. In some embodiments, the valid LBAs are grouped together and transferred to the host as a group. In some embodiments, a copy of the valid LBAs can be stored in the controller.

In step 7060, a mapping table in the host is updated with destination PBAs corresponding to the destination physical storage according to the valid LBAs. For example, as shown in FIG. 5, destination PBAs that correspond to the valid LBAs are updated in the mapping table stored in host FTL 510. In some embodiments, host FTL can re-order the valid LBAs to be recycled during the garbage collection process. For example, the garbage collection process can have a source block (e.g., source NAND block 531 of FIG. 5), and the original data layout in the source block may not be sequential. During the garbage collection process, host FTL 510 can re-order the sequence and placement of the valid LBAs so that the data layout is close to sequential access when the data is stored in the destination block (e.g., destination NAND block 531 of FIG. 5).

Figure 8:
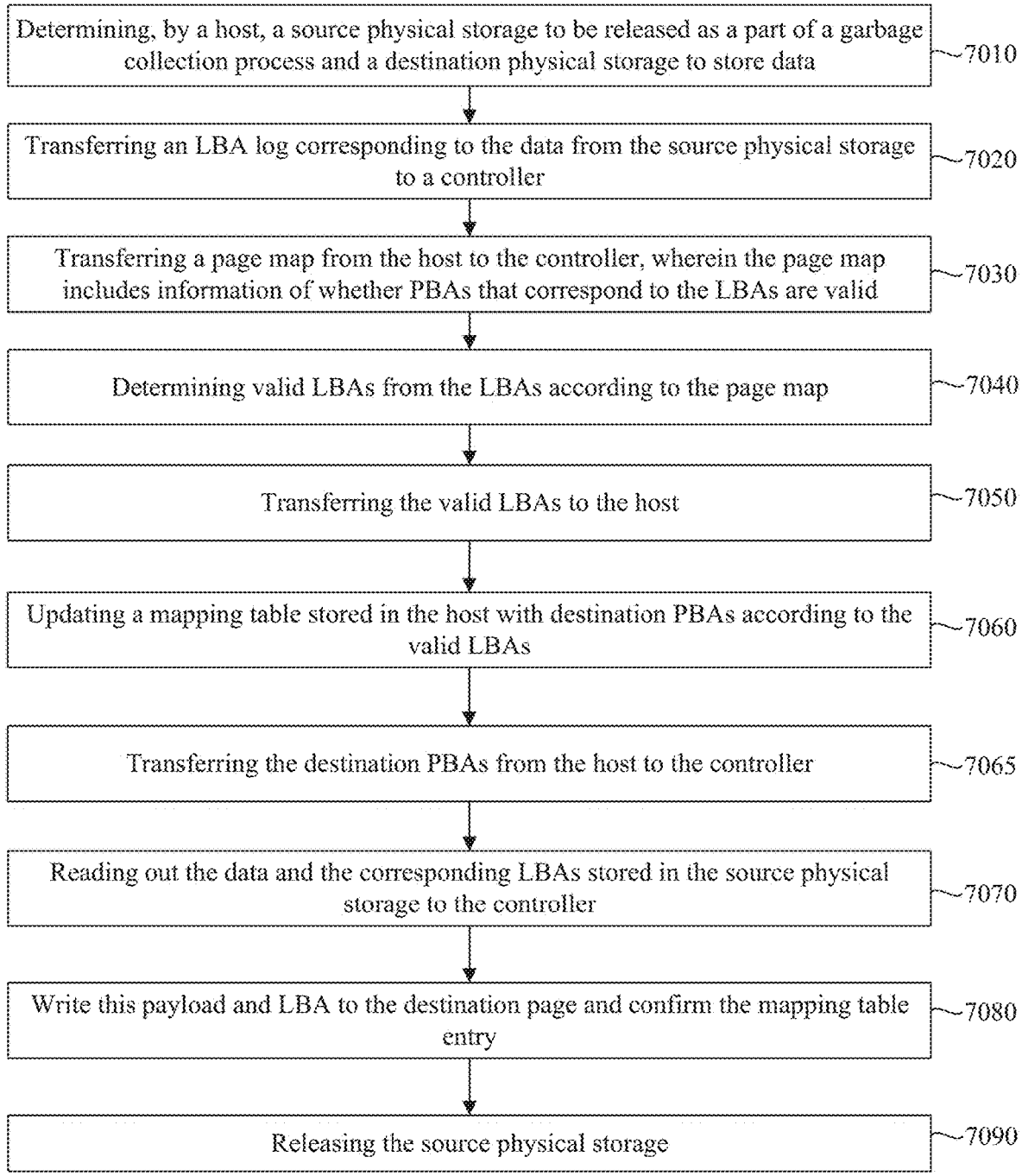
FIG. 8 is an illustration of an example method for utilizing host resources to improve garbage collections with destination data transfers, according to some embodiments of the present disclosure.

Embodiments of the present disclosure further provide a method for host resource utilization of improved garbage collections with destination data transfers. FIG. 8 is an illustration of an example method for utilizing host resources to improve garbage collections with destination data transfers, according to some embodiments of the present disclosure. On the basis of FIG. 7, method 7100 of FIG. 8 further comprises steps 7065, 7070, 7080, and 7090. It is appreciated that method 7100 of FIG. 8 can be executed on system 500 shown in FIG. 5.

After step 7060 has been executed, in step 7065, the destination PBAs are transferred from the host to the controller. For example, as shown in FIG. 5, destination PBAs "PBA_d" can be determined from the mapping table according to the valid LBAs, and the "PBA_d" can be transferred from host FTL 510 to SSD controller 520.

In step 7070, the data and corresponding LBAs stored in the source physical storage are read out or transferred to the controller. In some embodiments, the data and the LBAs are read out and stored in a data buffer in the controller. For example, as shown in FIG. 5, the data can be stored as a payload in the data buffer.

In step 7080, the data and the read LBAs are written into the destination physical storage according to the destination PBAs. For example, as shown in FIG. 5, data stored as the payload and the corresponding LBAs can be written into destination NAND block 532 according to the destination physical addresses "PBA_d."

In step 7090, the source physical storage is released. In some embodiments, the data and the LBAs stored in the source physical storage is erased. In some embodiments, the source physical storage is a NAND block in a flash drive, and the NAND block can be released to a pool of free blocks.

Figure 9:
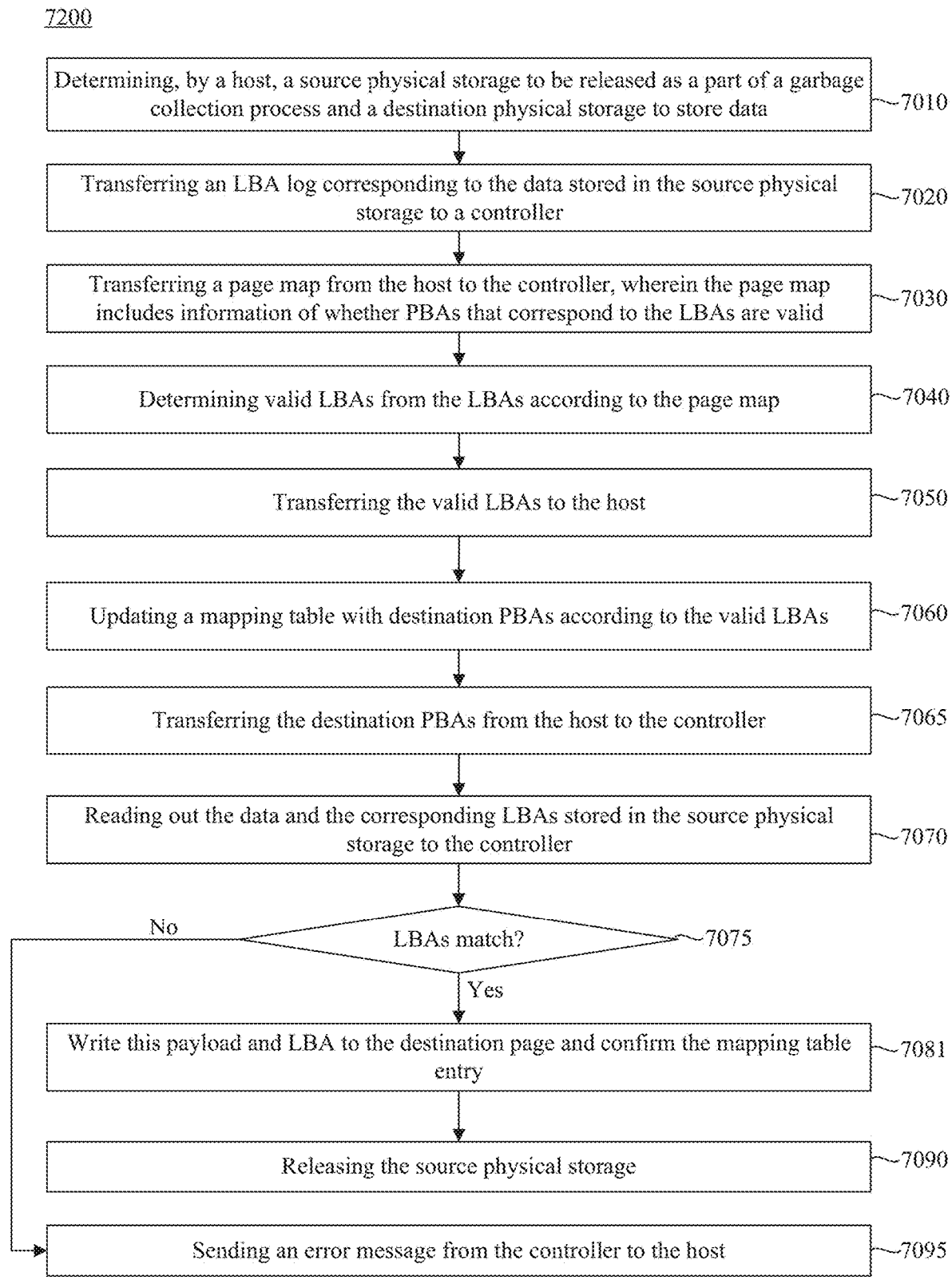
FIG. 9 is an illustration of an example method for utilizing host resources to improve garbage collections with logic address checking, according to some embodiments of the present disclosure.

Embodiments of the present disclosure further provide a method for host resource utilization of improved garbage collections with logic address checking. FIG. 9 is an illustration of an example method for utilizing host resources to improve garbage collections with logic address checking, according to some embodiments of the present disclosure. On the basis of FIG. 8, method 7200 of FIG. 9 further comprises steps 7075, 7081, and 7095. It is appreciated that method 7200 of FIG. 9 can be executed on system 500 shown in FIG. 5.

After step 7070, in step 7075, the LBAs read out in step 7070 are compared with the determined LBAs determined in step 7040 to determine if they match. In some embodiments, the read LBAs are compared with the LBAs determined in step 7040 bit by bit. For example, as shown in FIG. 5, a "bit-wise comparator" can be used to compare the LBAs. If the LBAs match, step 7081 is executed. If the LBAs do not match, step 7095 is executed.

In step 7081, in response to a determination that the read LBAs match with the determined LBAs, the data and the read LBAs are written into the destination physical storage according to the destination PBAs. For example, as shown in FIG. 5, data stored as the payload and the corresponding LBAs can be written into destination NAND block 532 according to the destination physical addresses "PBA_d."

In some embodiments, in response to a determination that the read LBAs match with the determined LBAs, mapping table entries corresponding to the read LBAs can be confirmed. For example, as shown in FIG. 5, there is a mapping table in host FTL 510. In response to the circuitry "LBA verify" finding a match between the read LBAs and the determined LBAs, the mapping table entries corresponding to the read LBAs can be confirmed.

In step 7095, in response to a determination that the read LBAs do not match with the determined LBAs, an error message is sent from the controller to the host. In some embodiments, the error message is sent to the mapping table stored in the host. For example, as shown in FIG. 5, there is a mapping table in host FTL 510. In response to the circuitry "LBA verify" finding a mismatch between the LBAs and the determined LBAs, the mapping table entries corresponding to the mismatched LBAs can be flagged in the mapping table according to the error message. In some embodiments, the garbage collection process is paused until the error message can be resolved.

Embodiments of the present disclosures provide systems and methods that improve the garbage collection process with host resource utilizations. When the garbage collection process is performed, the host (e.g., host FTL 510 of FIG. 5) receives valid LBAs instead of all LBAs that correspond to the data to be transferred. As a result, valuable bandwidth can be spared between the flash drive and the host. Moreover, the valid LBAs can be determined in the controller using hardware comparisons, which provides efficiency in the calculation of the valid LBAs. Moreover, the LBAs that are determined to be valid can be verified during the garbage collection procedure, further ensuring the reliability of the garbage collection procedure. Furthermore, the host can re-order the LBAs to form a data layout that is close to sequential access.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, SSD, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The host system, operating system, file system, and other functional units described in this disclosure can be implemented by hardware, or software, or a combination of hardware and software. One of ordinary skill in the art will also understand that multiple ones of the above described functional units may be combined as one functional unit, and each of the above described functional units may be further divided into a plurality of functional sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The embodiments may further be described using the following clauses:

1. A method to perform a garbage collection process, comprising:
 determining, by a host, a source physical storage to be released as a part of the garbage collection process and a destination physical storage to store data transferred from the source physical storage as a part of the garbage collection process;
 reading a logic address log corresponding to the data from the source physical storage to a controller, wherein the logic address log comprises logic addresses corresponding to the data;
 determining, by the controller, whether the logic addresses are valid;
 transferring the valid logic addresses to the host; and
 updating a mapping table with destination physical addresses according to the valid logic addresses, wherein:
  the mapping table is stored in the host, and
  the destination physical addresses correspond to the destination physical storage.

2. The method of clause 1, wherein determining, by controller, whether the logic addresses are valid further comprising:
 transferring a page map from the host to the controller, wherein the page map includes information of whether the logic addresses are valid, and
 determining whether the logic addresses are valid according to the page map.

3. The method of clause 2, wherein determining whether the logic address are valid according to the page map further comprises:
 augmenting valid bits stored in the page map to a length of the logic addresses, wherein each of the valid bits denotes whether a logic address of the logic addresses is valid;
 performing a bit-wise AND operation on the logic addresses with the augmented valid bits; and
 determining whether the logic addresses are valid according to results from the bit-wise AND operation.

4. The method of any one of clauses 1-4, further comprising:
 transferring the destination physical addresses from the host to the controller;
 reading the data and corresponding logic addresses stored in the source physical storage to the controller; and
 writing the data to the destination physical storage according to the destination physical addresses.

5. The method of clause 4, further comprising:
 storing the data and the corresponding logic addresses read from the source physical storage into a buffer, wherein the buffer is stored in the controller; and
 performing noise removal on the data.

6. The method of clause 4 or 5, further comprising:
 determining whether the logic addresses read from the source physical storage match the valid logic addresses; and
 writing the data to the destination physical storage according to the destination physical addresses further comprises:
  writing the data to the destination physical storage according to the destination physical addresses in response to a determination that the logic addresses read from the source physical storage match the valid logic addresses.

7. The method of clause 6, further comprising:
 in response to a determination that the logic addresses read from the source physical storage do not match the valid logic addresses:
  sending an error message to the host, and
  marking the source physical storage as read-only.

8. The method of any one of clauses 4-7, further comprising:
 releasing the source physical storage to a pool of free physical storages.

9. The method of any one of clauses 1-8, wherein:
 the source physical storage and the destination physical storage are NAND blocks in a flash drive;
 the controller is a flash drive controller corresponding to the flash drive; and
 the host comprises a flash translation layer corresponding to the flash drive.

10. The method of clause 9, wherein:
 the logic addresses are logic block addresses; and
 the physical addresses are physical block addresses.

11. A non-transitory computer readable medium that stores a set of instructions that is executable by at least one processor of a system to cause the system to perform a method of a garbage collection process, the method comprising:
 determining, by a host, a source physical storage to be released as a part of the garbage collection process and a destination physical storage to store data transferred from the source physical storage as a part of the garbage collection process;
 reading a logic address log corresponding to the data from the source physical storage to a controller, wherein the logic address log comprises logic addresses corresponding to the data;
 determining, by the controller, whether the logic addresses are valid;
 transferring the valid logic addresses to the host; and
 updating a mapping table with destination physical addresses according to the valid logic addresses, wherein:
  the mapping table is stored in the host, and
  the destination physical addresses correspond to the destination physical storage.

12. The non-transitory computer readable medium of clause 11, wherein the set of instructions is executable by the at least one processor of the system to cause the system to further perform:

transferring a page map from the host to the controller, wherein the page map includes information of whether the logic addresses are valid, and determining whether the logic addresses are valid according to the page map.

13. The non-transitory computer readable medium of clause 12, wherein the set of instructions is executable by the at least one processor of the system to cause the system to further perform:

augmenting valid bits stored in the page map to a length of the logic addresses, wherein each of the valid bits denotes whether a logic address of the logic addresses is valid;

performing a bit-wise AND operation on the logic addresses with the augmented valid bits; and determining whether the logic addresses are valid according to results from the bit-wise AND operation.

14. The non-transitory computer readable medium of any one of clauses 11-13, wherein the set of instructions is executable by the at least one processor of the system to cause the system to further perform:

transferring the destination physical addresses from the host to the controller;

reading the data and corresponding logic addresses stored in the source physical storage to the controller; and writing the data to the destination physical storage according to the destination physical addresses.

15. The non-transitory computer readable medium of clause 14, wherein the set of instructions is executable by the at least one processor of the system to cause the system to further perform:

storing the data and the corresponding logic addresses read from the source physical storage into a buffer, wherein the buffer is stored in the controller; and performing noise removal on the data.

16. The non-transitory computer readable medium of clause 14 or 15, wherein the set of instructions is executable by the at least one processor of the system to cause the system to further perform:

determining whether the logic addresses read from the source physical storage match the valid logic addresses; and writing the data to the destination physical storage according to the destination physical addresses further comprises:

writing the data to the destination physical storage according to the destination physical addresses in response to a determination that the logic addresses read from the source physical storage match the valid logic addresses.

17. The non-transitory computer readable medium of clause 16, wherein the set of instructions is executable by the at least one processor of the system to cause the system to further perform:

in response to a determination that the logic addresses read from the source physical storage do not match the valid logic addresses:

sending an error message to the host, and marking the source physical storage as read-only.

18. The non-transitory computer readable medium of any one of clauses 14-17, wherein the set of instructions is executable by the at least one processor of the system to cause the system to further perform:

releasing the source physical storage to a pool of free physical storages.

19. The non-transitory computer readable medium of any one of clauses 11-18, wherein:

the source physical storage and the destination physical storage are NAND blocks in a flash drive;

the controller is a flash drive controller corresponding to the flash drive; and the host comprises a flash translation layer corresponding to the flash drive.

20. The non-transitory computer readable medium of clause 19, wherein:

the logic addresses are logic block addresses; and the physical addresses are physical block addresses.

21. A system for performing a garbage collection process, comprising:

a host;

a source physical storage configured to be released as a part of the garbage collection process;

a destination physical storage configured to store data transferred from the source physical storage as a part of the garbage collection process;

a controller communicatively coupled to the host, the source physical storage, and the destination physical storage, the controller is configured to:

read a logic address log corresponding to the data from the source physical storage, wherein the logic address log comprises logic addresses corresponding to the data;

determine whether the logic addresses are valid; and transfer the valid logic addresses to the host, wherein:

the host is configured to update a mapping table with destination physical addresses according to the valid logic addresses, the mapping table is stored in the host, and the destination physical addresses correspond to the destination physical storage.

22. The system of clause 21, wherein the controller is further configured to:

transfer a page map from the host to the controller, wherein the page map includes information of whether the logic addresses are valid, and determine whether the logic addresses are valid according to the page map.

23. The system of clause 22, wherein the controller is further configured to:

augment valid bits stored in the page map to a length of the logic addresses, wherein each of the valid bits denotes whether a logic address of the logic addresses is valid;

perform a bit-wise AND operation on the logic addresses with the augmented valid bits; and determine whether the logic addresses are valid according to results from the bit-wise AND operation.

24. The system of any one of clauses 20-23, wherein:

the host is configured to transfer the destination physical addresses from the host to the controller; and the controller is further configured to:

read the data and corresponding logic addresses stored in the source physical storage to the controller; and write the data to the destination physical storage according to the destination physical addresses.

25. The method of clause 24, wherein the controller is further configured to:

store the data and the corresponding logic addresses read from the source physical storage into a buffer, wherein the buffer is stored in the controller; and perform noise removal on the data.

26. The system of clause 24 or 25, wherein the controller is further configured to:

determine whether the logic addresses read from the source physical storage match the valid logic addresses; and write the data to the destination physical storage according to the destination physical addresses in response to a determination that the logic addresses read from the source physical storage match the valid logic addresses.

27. The system of clause 26, wherein the controller is further configured to:

in response to a determination that the logic addresses read from the source physical storage do not match the valid logic addresses, send an error message to the host.

28. The system of any one of clause 24-27, wherein the system is further configured to release the source physical storage to a pool of free physical storages.

29. The system of any one of clauses 21-28, wherein:

the source physical storage and the destination physical storage are NAND blocks in a flash drive;

the controller is a flash drive controller corresponding to the flash drive; and the host comprises a flash translation layer corresponding to the flash drive.

30. The system of clause 29, wherein:

the logic addresses are logic block addresses; and the physical addresses are physical block addresses.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method to perform a garbage collection process, comprising:

determining, by a host, a source physical storage to be released as a part of the garbage collection process and a destination physical storage to store data transferred from the source physical storage as a part of the garbage collection process;

reading a logic address log corresponding to the data from the source physical storage to a controller, wherein the logic address log comprises logic addresses in the source physical storage where the data is to be transferred from as part of the garbage collection process;

determining, by the controller, whether the logic addresses are valid, comprising:

transferring a page map from the host to the controller, wherein the page map includes information of whether the logic addresses are valid; and determining whether the logic addresses are valid according to the page map, comprising:

augmenting valid bits stored in the page map to a length of the logic addresses, wherein each of the valid bits denotes whether a logic address of the logic addresses is valid:

performing a bit-wise AND operation on the logic addresses with the augmented valid bits; and determining whether the logic addresses are valid according to results from the bit-wise AND operation;

transferring the valid logic addresses to the host; and updating a mapping table with destination physical addresses according to the valid logic addresses, wherein:

the mapping table is stored in the host, and the destination physical addresses correspond to the destination physical storage.

2. The method of claim 1, further comprising:

transferring the destination physical addresses from the host to the controller;

reading the data and corresponding logic addresses stored in the source physical storage to the controller; and writing the data to the destination physical storage according to the destination physical addresses.

3. The method of claim 2, further comprising:

storing the data and the corresponding logic addresses read from the source physical storage into a buffer, wherein the buffer is stored in the controller; and performing noise removal on the data.

4. The method of claim 2, further comprising:

determining whether the logic addresses read from the source physical storage match the valid logic addresses; and writing the data to the destination physical storage according to the destination physical addresses further comprises:

writing the data to the destination physical storage according to the destination physical addresses in response to a determination that the logic addresses read from the source physical storage match the valid logic addresses.

5. The method of claim 4, further comprising:

in response to a determination that the logic addresses read from the source physical storage do not match the valid logic addresses:

sending an error message to the host, and marking the source physical storage as read-only.

6. The method of claim 2, further comprising:

releasing the source physical storage to a pool of free physical storages.

7. The method of claim 1, wherein:

the source physical storage and the destination physical storage are NAND blocks in a flash drive;

the controller is a flash drive controller corresponding to the flash drive; and the host comprises a flash translation layer corresponding to the flash drive.

8. The method of claim 7, wherein:

the logic addresses are logic block addresses; and the physical addresses are physical block addresses.

9. A non-transitory computer readable medium that stores a set of instructions that is executable by at least one processor of a system to cause the system to perform a method of a garbage collection process, the method comprising:

determining, by a host, a source physical storage to be released as a part of the garbage collection process and a destination physical storage to store data transferred from the source physical storage as a part of the garbage collection process;

reading a logic address log corresponding to the data from the source physical storage to a controller, wherein the logic address log comprises logic addresses in the source physical storage where the data is to be transferred from as part of the garbage collection process;

determining, by the controller, whether the logic addresses are valid, comprising:

transferring a page map from the host to the controller, wherein the page map includes information of whether the logic addresses are valid; and determining whether the logic addresses are valid according to the page map, comprising:

augmenting valid bits stored in the page map to a length of the logic addresses, wherein each of the valid bits denotes whether a logic address of the logic addresses is valid;

performing a bit-wise AND operation on the logic addresses with the augmented valid bits; and determining whether the logic addresses are valid according to results from the bit-wise AND operation;

transferring the valid logic addresses to the host; and
updating a mapping table with destination physical addresses according to the valid logic addresses, wherein:
the mapping table is stored in the host, and
the destination physical addresses correspond to the destination physical storage.

10. A system for performing a garbage collection process, comprising:
a host;
a source physical storage configured to be released as a part of the garbage collection process;
a destination physical storage configured to store data transferred from the source physical storage as a part of the garbage collection process;
a controller communicatively coupled to the host, the source physical storage, and the destination physical storage, the controller is configured to:
read a logic address log corresponding to the data from the source physical storage, wherein the logic address log comprises logic addresses in the source physical storage where the data is to be transferred from as part of the garbage collection process;
determine whether the logic addresses are valid, wherein the controller is configured to:
transfer a page map from the host to the controller, wherein the page map includes information of whether the logic addresses are valid; and
determine whether the logic addresses are valid according to the page map, wherein the controller is configured to:
augment valid bits stored in the page map to a length of the logic addresses, wherein each of the valid bits denotes whether a logic address of the logic addresses is valid:
perform a bit-wise AND operation on the logic addresses with the augmented valid bits; and
determine whether the logic addresses are valid according to results from the bit-wise AND operation; and
transfer the valid logic addresses to the host, wherein:
the host is configured to update a mapping table with destination physical addresses according to the valid logic addresses,
the mapping table is stored in the host, and
the destination physical addresses correspond to the destination physical storage.

11. The system of claim 10, wherein:
the host is configured to transfer the destination physical addresses from the host to the controller; and
the controller is further configured to:
read the data and corresponding logic addresses stored in the source physical storage to the controller; and
write the data to the destination physical storage according to the destination physical addresses.

12. The method of claim 11, wherein the controller is further configured to:
store the data and the corresponding logic addresses read from the source physical storage into a buffer, wherein the buffer is stored in the controller; and
perform noise removal on the data.

13. The system of claim 11, wherein the controller is further configured to:
determine whether the logic addresses read from the source physical storage match the valid logic addresses; and
write the data to the destination physical storage according to the destination physical addresses in response to a determination that the logic addresses read from the source physical storage match the valid logic addresses.

14. The system of claim 13, wherein the controller is further configured to:
in response to a determination that the logic addresses read from the source physical storage do not match the valid logic addresses, send an error message to the host.

15. The system of claim 11, wherein the system is further configured to release the source physical storage to a pool of free physical storages.

16. The system of claim 10, wherein:
the source physical storage and the destination physical storage are NAND blocks in a flash drive;
the controller is a flash drive controller corresponding to the flash drive; and
the host comprises a flash translation layer corresponding to the flash drive.

17. The system of claim 16, wherein:
the logic addresses are logic block addresses; and
the physical addresses are physical block addresses.

* * * * *